(12) United States Patent
Nadella et al.

(10) Patent No.: US 10,481,765 B2
(45) Date of Patent: Nov. 19, 2019

(54) GRAPHICAL USER INTERFACE AND METHOD AND APPARATUS OF NAVIGATING USING SAME

(71) Applicant: Walmart Apollo, LLC, Bentonville, AR (US)

(72) Inventors: Trinadh K. Nadella, Bentonville, AR (US); Kavitha Devineni, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 334 days.

(21) Appl. No.: 15/284,835

(22) Filed: Oct. 4, 2016

(65) Prior Publication Data
US 2017/0102839 A1 Apr. 13, 2017

Related U.S. Application Data

(60) Provisional application No. 62/239,631, filed on Oct. 9, 2015.

(51) Int. Cl.
*G06F 3/048* (2013.01)
*G06F 3/0482* (2013.01)
(Continued)

(52) U.S. Cl.
CPC .......... *G06F 3/0482* (2013.01); *G06F 16/287* (2019.01); *G06F 16/954* (2019.01); *G06Q 30/0641* (2013.01); *G06F 17/2241* (2013.01)

(58) Field of Classification Search
CPC ..................................................... G06F 3/048
See application file for complete search history.

(56) References Cited

U.S. PATENT DOCUMENTS

| 7,210,094 B2 | 4/2007 | Dovin |
| 8,219,669 B2 | 7/2012 | Agrusa |

(Continued)

OTHER PUBLICATIONS

"Oracle Fusion Middleware Java API Reference for Oracle Extension SDK Reference 11 g Release 1 (11.1.1.4.0)"; http://docs.oracle.com/cd/E23549_01/apirefs.1111/e13403/oracle/javatools/ui/breadcrumbs/package-summary.html; May 13, 2015; pp. 1.

(Continued)

*Primary Examiner* — Pei Yong Weng
(74) *Attorney, Agent, or Firm* — Fitch, Even, Tabin & Flannery LLP (57) ABSTRACT

In some embodiments, apparatus, systems and methods are disclosed for interfacing with systems and networks, and the data stored thereon, including navigation of same. The apparatus, systems and methods may dynamically populate a graphical user interface menu with a pop-up menu containing cross-navigational elements to navigate between different hierarchical lists of data, such as for example, in a system having a database containing data pertaining to at least one retail item, an electronic device in communication with the database and having a control unit and at least one display, the control unit configured to: display a graphical user interface on the display having a menu with a first hierarchical list of categories or a second hierarchical list of categories, the hierarchical lists of categories being arranged into common tiers of data; determine which hierarchical list and tier has been selected by a user; and dynamically populate and display, via the control unit, a pop-up menu containing data associated with the selected hierarchical list and tier as well as cross-navigational data corresponding to the common tier of data from the other, non-selected, hierarchical list to simplify navigation between hierarchical lists.

20 Claims, 3 Drawing Sheets

FIG. 1

(51) Int. Cl.
*G06F 16/28* (2019.01)
*G06F 16/954* (2019.01)
*G06Q 30/06* (2012.01)
*G06F 17/22* (2006.01)

(56) References Cited

U.S. PATENT DOCUMENTS

| | | |
|---|---|---|
| 8,488,172 B2 | 7/2013 | Hawes |
| 2011/0298806 A1 | 12/2011 | Rasmussen |
| 2012/0254801 A1 | 10/2012 | Gaffney |
| 2013/0036381 A1 | 2/2013 | Joshi |
| 2013/0086056 A1* | 4/2013 | Dyor .................. G06F 3/167 707/730 |
| 2013/0173593 A1 | 7/2013 | Nations |
| 2013/0232128 A1 | 9/2013 | Krishnan |
| 2014/0053060 A1 | 2/2014 | Walker |
| 2015/0082251 A1* | 3/2015 | Lam ................ G06F 17/30126 715/843 |
| 2015/0242106 A1* | 8/2015 | Penha .............. G06F 3/04847 715/854 |

OTHER PUBLICATIONS

"Oracle Fusion Middleware Java API Reference for Oracle Extension SDK Reference 11 g Release 2 (11.1.2.2.0)"; https://docs.oracle.com/cd/E26098_01/apirefs.1112/e17493/oracle/javatools/ui/breadcrumbs/package-summary.html; May 13, 2015; pp. 1.
Grouchnikov, Kirill; "Breadcrumb bar—from closed source to open source"; May 13, 2015; pp. 1-3.
Khadakkar, Pravin; "OBIEE 11g Release 11.1.1.7 Breadcrumbs—Easy Navigation Option"; Dec. 27, 2013; pp. 1-2.

\* cited by examiner

GRAPHICAL USER INTERFACE AND METHOD AND APPARATUS OF NAVIGATING USING SAME

CROSS-REFERENCE TO RELATED APPLICATION

This application claims the benefit of U.S. Provisional Application No. 62/239,631, filed Oct. 9, 2015, and is incorporated herein by reference in its entirety.

TECHNICAL FIELD

This invention relates generally to a graphical user interface and methods and apparatus of navigating systems using same, and more particularly, to retail store management systems, and methods and apparatus of navigating same.

BACKGROUND

With the complexity of today's computer systems and networks, navigation of these systems, networks and the data they contain is essential to making the experience useful, user friendly and even enjoyable or at least less painful than the next alternative so that the user will continue to use the system, network, etc. This proved true for Apple when it simplified the use of the personal computer with its early graphical user interface (GUI) and mouse-based computers leading to a sales advantage over the then predominant Microsoft DOS based competitors. Similarly, when the Internet started to flourish, users flocked to Netscape's Navigator because of the user friendly interface and better search engine it offered. With the ever increasing complexity of systems and networks whether it be wide area networks (WANs) like the Internet or local area networks (LANs) like typical business entity systems and servers, it remains important to make these systems and the data they contain easy to navigate.

In many industries, it is necessary to manage large volumes of data and provide user friendly access to this data to various managers and analysts. For example, some larger retailers desire to track performance data for every segment of their business from a single product category in an individual store all the way up to the performance of all stores for a multi-store retailer. The growth of the Internet of Things (IoT) and use of more sophisticated or smart retailer systems that track product movement from purchasing, intake, stocking, sale and/or reordering or replenishing of same creates even more complex systems and big data issues that need to be addressed. Some attempts have been made at addressing this issue by providing complex business enterprise platforms, such as Oracle's Business Intelligence Enterprise Edition ("OBIEE"), but these system still lack the flexibility and or convenience that is desired by the entities that use these systems and, thus, are not as user friendly as they could be in order to allow the user to quickly use, study and/or compare this data. For example, conventional systems like OBIEE typically require the user to know the categories of information he or she wants and to drill down on that data, then back out to higher level categories, switch to a different product category, department, store, region, etc. and then begin the process all over again. In other words, such systems usually have a rigid framework and hierarchy structure that the user must follow to access the data they need rather than offering flexibility and convenience to the user to mine the data maintained by the system as they would like.

Accordingly, it has been determined that a need exists for improved systems, apparatus and methods for handling and navigating data and for interfaces utilized with such systems, apparatus and methods.

BRIEF DESCRIPTION OF THE DRAWINGS

Disclosed herein are embodiments of graphical user interfaces and systems, apparatus and methods for handling and/or navigating data, and more particularly, to retail store management systems, apparatus and methods and interfaces for same.

This description includes drawings, wherein.

Elements in the figures are illustrated for simplicity and clarity and have not necessarily been drawn to scale or to include all features, options or attachments. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking and pursuant to various embodiments, systems, apparatus and methods are provided herein that utilize a more flexible and convenient user interface that allows a user to navigate systems and data, such as business intelligence platforms, more easily to access, view, compare or otherwise utilize data of interest. More particularly, the systems, apparatus and methods disclosed herein allow the user interface to utilize navigation aids to break from rigidly structured hierarchal frameworks to allow the user to more quickly navigate between data that the user frequently needs to check regardless of whether it falls within or outside of the presently selected hierarchal framework. For example, instead of only allowing the user to access data within a selected hierarchal framework made up of a root category followed by selected tiers, exemplary embodiments of the present invention utilize navigational aids such as breadcrumbs or breadcrumb trails to populate a presently selected tier with categories from the tier of the selected hierarchy as well as categories from other non-selected hierarchy that are frequently accessed by the user to give the user quick or ready access to this data rather than requiring the user to back out of the hierarchal selections that have been made and switch to a different hierarchal path or string of selections. In a preferred form, the In a preferred form, systems, apparatus and methods are disclosed herein that can dynamically populate a graphical user interface menu with a pop-up menu containing cross-navigational elements to navigate between different hierarchical lists of data, such as for example, in a system having a database containing data pertaining to at least one retail item, an electronic device in communication with the database and having a control unit and at least one display, the control unit configured to: display a graphical user interface on the display having a menu with a first hierarchical list of categories or a second hierarchical list of categories, the hierarchical lists of categories being arranged into common tiers of data; determine which hierarchical list and tier has been selected by a user; and dynamically populate and display, via the control unit, a pop-up menu containing data associated with the selected hierarchical list and tier as well as cross-navigational data corresponding to the common tier of data from the other, non-selected, hierarchical list to simplify navigation between hierarchical lists.

Figure 1:
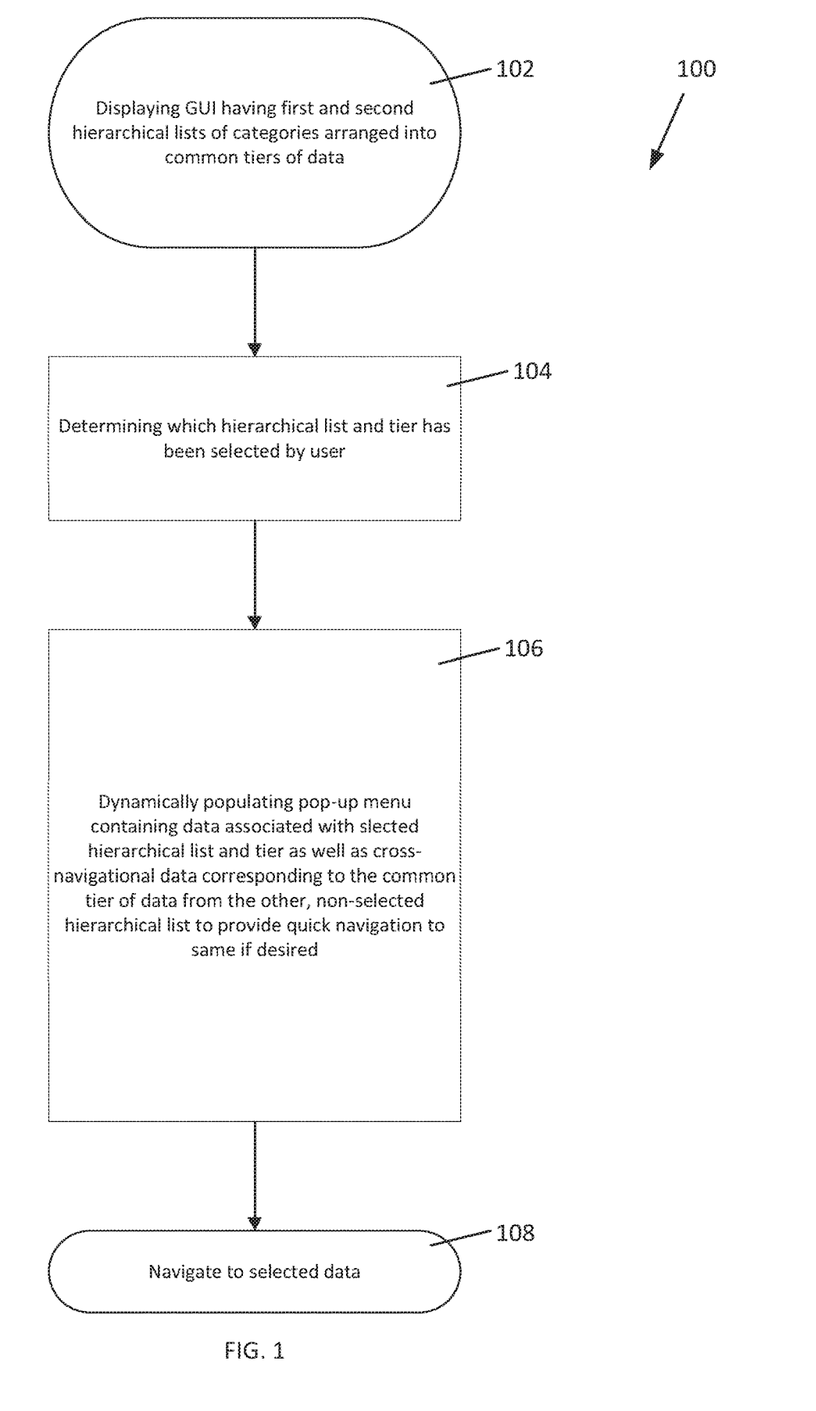
FIG. 1 is a flow diagram of a general process in accordance with some embodiments of the invention.

Turning now to FIG. 1, there is illustrated a flow diagram of a general process in accordance with some embodiments of the invention which is referenced generally by reference numeral 100. In this embodiment, the process begins with displaying a graphical user interface (GUI) having first and second hierarchical lists of categories arranged into common tiers of data in step 102. In a preferred form, the hierarchical lists will require selection of a root category from a plurality of possible root category selections followed by the selection of one or more tiers of categories. In examples with multiple tiers of categories, the tiers will be selected in succession and typically each tier will have a plurality of categories to select from thereby creating a variety of different hierarchal paths or branches that could stem from each root category selection. The process then determines which hierarchical list and tier has been selected by the user in step 104. As the user moves on to the next tier to select from the plurality of categories, the process dynamically populates the tier options with data or selections associated with the selected hierarchical list and tier as well as cross-navigational data or selections corresponding to the common tier of data from another non-selected hierarchal list in step 106 to provide quick navigation to same if desired. The process then proceeds to navigate to the selected data or selection in step 108.

Figure 2:
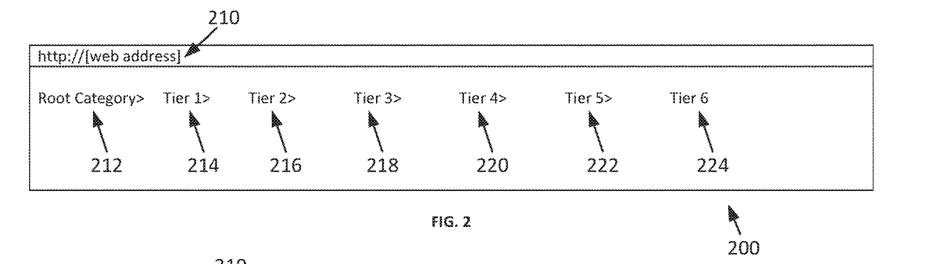
FIG. 2 is a conventional graphical user interface for a business intelligence platform illustrating a typical structured architecture and hierarchy.

While this is easy to understand if immersed in the operation of the systems, apparatus and methods disclosed herein, it is much easier to understand upon reviewing actual GUI examples. In FIG. 2 a conventional GUI for a business intelligence platform illustrating a typical structured architecture and hierarchy is illustrated and referenced generally by reference numeral 200. In this example, interface 200 is web-based and accessible using the appropriate identifier in the header 210, such as a protocol and domain name to identify the desired destination. The interface 200 further includes a root category 212 that preferably allows the user to choose from a plurality of categories and then numerous sub-categories or tiers arranged in a hierarchical order. In the embodiment shown, after selecting the root category 212, the user selects a first tier or Tier 1 category that again will preferably include a plurality of options or selections to choose from with this tier illustrated at 214. In this embodiment, first tier 214 is a set of sub-categories that depend on which root category 212 has been selected. A multi-tier configuration is illustrated offering selectable tiers or fields including second tier (Tier 2) 216, third tier (Tier 3) 218, fourth tier (Tier 4) 220, fifth tier (Tier 5) 222 and sixth tier (Tier 6) 224. In a preferred form, each tier will contain a plurality of categories (e.g., options or selections) and be determined from the selections that have been made in prior tiers and the root category.

Figure 3:
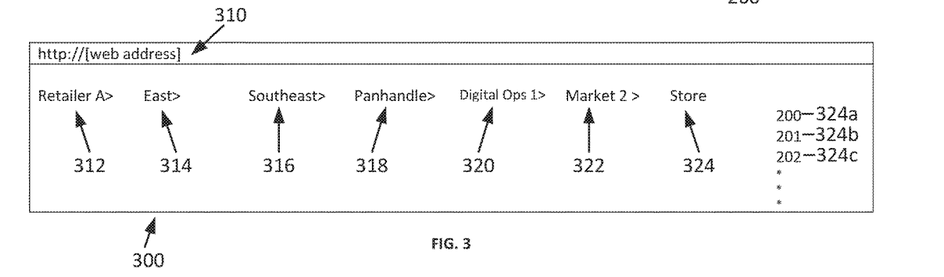
FIG. 3 is a conventional graphical user interface for a business intelligence platform dashboard for a multi-store retailer illustrating a structured architecture and hierarchy drilled down to a first set of stores or store categories in a first market.

Such a hierarchical architecture structure is well known and FIG. 3 illustrates how such a structure might be implemented in a GUI for a business intelligence platform dashboard for a multi-store retailer illustrating a structured architecture and hierarchy drilled down to a first set of stores or store categories in a first market. For convenience, items in FIG. 3 that are similar to those discussed above with respect to FIG. 2 will utilize the same latter two-digit reference numeral as those referenced in FIG. 2, however, they will be prefixed with number 3, instead of 2, in order to distinguish one embodiment from the other. Thus, the interface of FIG. 3 is referenced generally by reference numeral 300 and includes a header 310, root category 312, first tier 314, second tier 316, third tier 318, fourth tier 320, fifth tier 322 and sixth tier 324. In this form, the interface 300 allows the user to select a desired retailer or store chain in root category 312 from a plurality of retailers or chains. Once retailer is selected, the user can then select a desired region as first tier 314, division within the selected region as second tier 316 and sub-division within the selected division as third tier 318. The user can select from a variety of operations options under fourth tier digital operations 320, and finally select from available markets given prior selections under fifth tier 322 and from available stores under the selected market under sixth tier 324. In the form illustrated, available stores are shown as store #200, store #201, store #202, etc., which are referenced generally by reference numerals 324a, 324b and 324c, etc., respectively. In a preferred form, the available stores to select from will be displayed as a pop-up menu that appears on the display once the user points his or her cursor over the store field 324. In some forms the system 300 will be setup so that the user merely slides his or her curser over the desired store number (e.g., 324a, 324b, 324c) and selects same in order to access the dashboard data for this store.

It should be understood that this is merely one organizational structure for such an interface and the actual interface could offer more or fewer tier or field options and any number of different options or optional selections under each field or tier. For example, instead of a GUI allowing a user to request dashboard statistics on a particular store within a market, sub-region, region and retail chain, the GUI could be setup to work on an individual store dashboard statistic set by allowing the user to select from various products within a particular product category, sub-department, department and store.

Figure 4:
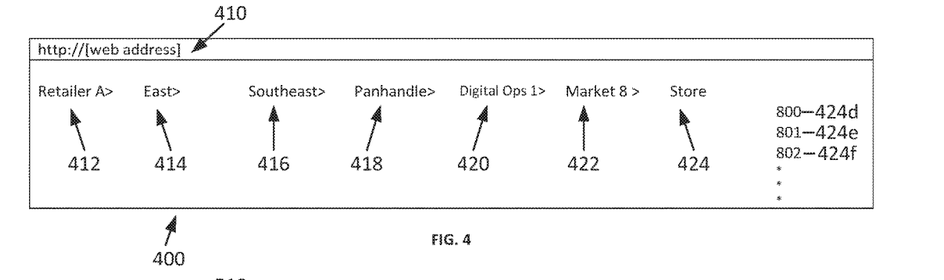
FIG. 4 is the business intelligence platform of FIG. 3 drilled down to a second set of stores or store categories in a second market.

An illustration of how different selections made under each category or tier can alter the available tier options is illustrated in FIG. 4. In keeping with the above, the same latter two-digit reference numerals will be used to describe items or features similar to those discussed above, but use a prefix 4 to distinguish this embodiment from others. In this form, the interface 400 is setup similar to that of interface 300 in FIG. 3 with a header field 410, a root category offering selections related to retailer or retail chain in field 412, region in field 414, division in field 416, sub-division in field 418, operations in field 420, market in field 422 and store in field 424. Unlike system 300 in FIG. 3, however, the stores listed in the sixth tier or field 424 are different than those listed as stores in sixth tier or field 324 of system 300 because a different market has been selected in tier or field 422 in FIG. 4. More particularly, the user can select from store #800, store #801 and store #802 at reference numerals 424d, 424e and 424f, respectively, which are the options offered given Market #8 was selected in FIG. 4 rather than market #2 as was the case in FIG. 3. While this is an example of how the tier or field options change downstream when a different upstream category or selection has been made, it should be understood that any of the other tiers or fields 412, 414, 416, 418, 420, 422 and 424 could be changed to offer yet other options to the user.

While the above interfaces are helpful and give users the ability to pull-up dashboard data in a variety of ways to analyze and compare data within the system, they still do not allow the user to conveniently and easily access, compare or analyze data that is routinely accessed by the user. For example, if a manager is in charge of store #201 (324b) in Market 2 and store #800 (424d) in Market 8, the manager has to select Market 2 to access the store #201 data and then back-out of that selection and select Market 8 to access store #800 data. This does not make the interface as user friendly as it could be or operate as efficiently as it could. Thus, in addition to the above, systems, apparatus and methods are disclosed herein that also track the user's use of the system in order to populate each pop-up menu with frequently accessed selections by the user and not just those options that fall within the specific field or tier that has been selected. In a preferred form, the system will track breadcrumb or breadcrumb trail data (also known as cookie crumb or navigation path data) to determine what cross-navigation options should be offered in the pop-up window that appears under each tier or field heading once selected. In a preferred form, the cross-navigation breadcrumb data that will be displayed will only come from the same tier of data meaning the pop-up will not provide options under the tier selected and cross-navigation data from an entirely different tier (e.g., the system or interface will not provide tier 6 data with cross-navigation data from tier 2). However, in certain circumstances where this may be desired, the system could be configured to do just that as needed or desired.

Figure 5:
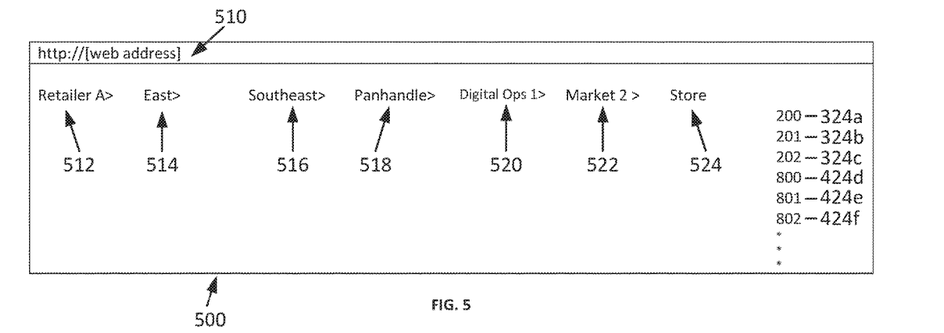
FIG. 5 is a graphical user interface for a business intelligence platform in accordance with some embodiments of the invention illustrating a less structured architecture and hierarchy or more flexible and convenient interface and platform that allows a user to quickly navigate between different hierarchical categories.

In FIG. 5 an interface for a business intelligence platform in accordance with some embodiments of the invention is illustrated and offers a less structured architecture and hierarchy or more flexible and convenient interface and platform that allows a user to quickly navigate between different hierarchical categories based on breadcrumb navigation data that suggests these cross-navigation items are of relevance to the user so that the user may use same to quickly navigate to desired information without the need to backtrack upstream to select or change a selected upstream field or tier so that access can be obtained to the desired downstream options. In keeping with the above, items in FIG. 5 that are similar to those discussed in earlier embodiments (e.g., FIGS. 2, 3 and 4) will be referenced using the same latter two digit reference numeral but adding the prefix 5 to distinguish one embodiment from others. Thus, in FIG. 5 the interface is referred to generally by reference numeral 500 and includes a header or title bar 510, a main root category tier or field 512, a region field or tier 514, division field or tier 516, sub-division field or tier 518, operations field or tier 520, market field or tier 522 and store field or tier 524. To illustrate how system 500 differs from those discussed above, the fields or tier selections made in system 500 are the same as those made or selected in system 300 of FIG. 3, however, unlike system 300, system 500 not only displays the selected stores from market 2 in field or tier 524, but also displays cross-navigational data of other stores the user has accessed previously based on breadcrumb data. Thus, in addition to the stores from Market 2, system 500 also displays stores from Market 8 as the breadcrumb trail data indicated this particular user has accessed these stores. This allows the user to quickly jump from stores in Market 2 to stores in Market 8 without having to backtrack upstream to change the selection from Market 2 in field or tier 522 to Market 8 to access this information.

Figure 6:
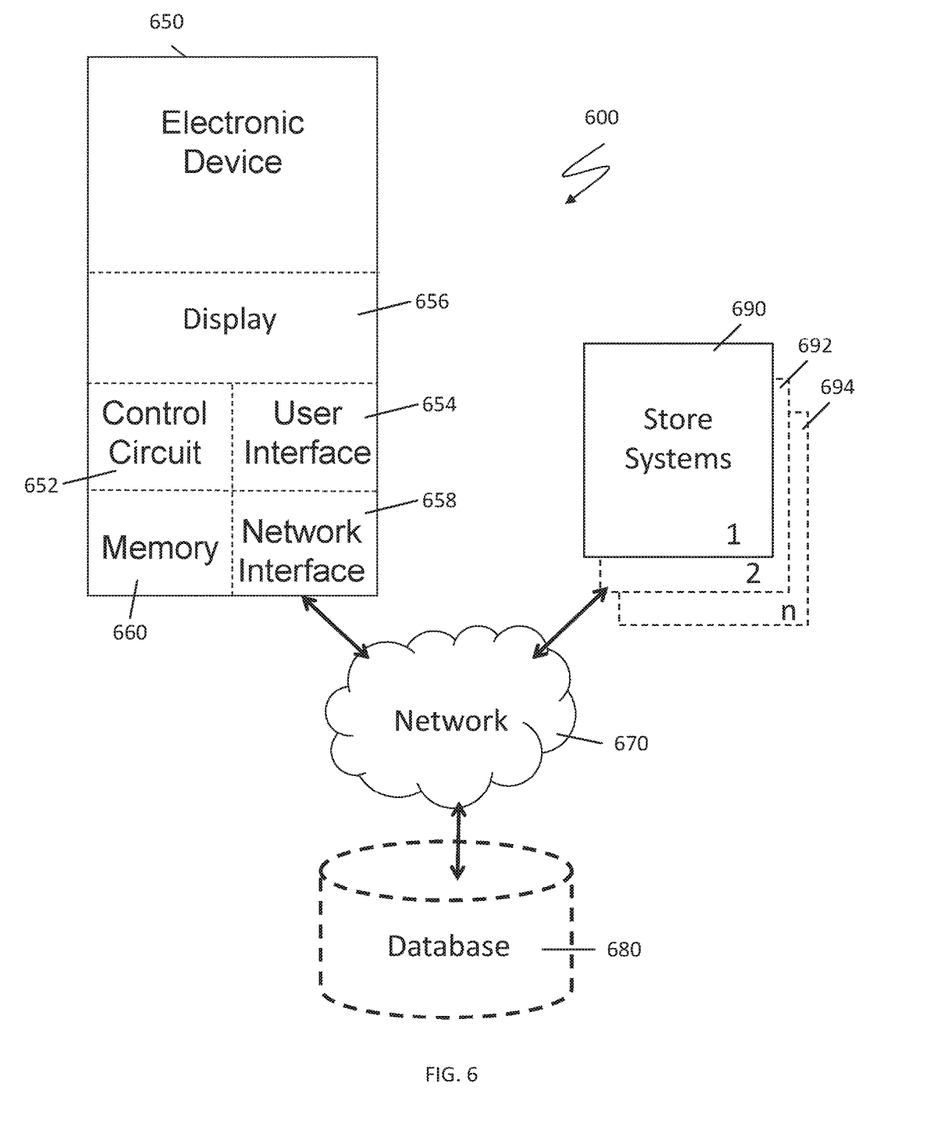
FIG. 6 is a diagram of a general system in accordance with several embodiments of the invention.

A system or apparatus in accordance with one embodiment of the invention is illustrated in FIG. 6 and referenced generally by reference numeral 600. In the form illustrated, the system 600 includes an electronic device 650 having a control circuit 652 with a user interface 654 and display 656. The controller 652 operates via an interface similar to those discussed above and, thus, is configured to dynamically populate a GUI menu on display 656 with a pop-up menu containing cross-navigational elements to navigate between different hierarchical lists of data. In some instances the system 600 may be setup as a standalone device that operates in the manner discussed above. However, in other instances, the system 600 will be setup as network as illustrated in FIG. 6 with the electronic device 650 having a network interface 658 that connects the device 650 to network 670. In some forms, the network 670 may be a local area network (LAN) wherein the electronic device is connected to a local central computer or server. In other forms, the network 670 may be a wide area network (WAN), such as the Internet, wherein the electronic device 650 may be connected to a local or remote computer system or server.

In the form illustrated in FIG. 6, the electronic device 650 is preferably connected to a database 680 containing data pertaining to at least one item, such as a retail item, and communicates with the database 670 via control unit or circuit 652 which is configured to display a graphical user interface on the display 656 having a menu with a first hierarchical list of categories or a second hierarchical list of categories, with the hierarchical lists of categories being arranged into common tiers of data. The control unit 652 is further configured to determine which hierarchical list and tier has been selected by a user, and dynamically populate and display, via the control circuit 652, a pop-up menu containing data associated with the selected hierarchical list and tier as well as cross-navigational data corresponding to the common tier of data from the other, non-selected, hierarchical list to simplify navigation between hierarchical lists similar to that described above for system 500. In a preferred form, the non-selected hierarchical data is determined from breadcrumb data thereby ensuring that the cross-navigational data is data that is relevant to the user based on the fact the user has accessed that data previously. In addition, the cross-navigational breadcrumb data is preferably data from the same field or tier in the non-selected hierarchical branch as the tier of the selected hierarchal or hierarchical data (e.g., the system would automatically populate a pop-up menu for Tier 2 with Tier 2 data from the selected hierarchy branch along with Tier 2 data from the non-selected hierarchy branch that breadcrumb data indicates the user has accessed previously in order to provide the user with an easy way to navigate over to the other hierarchy branch without backtracking to an upstream tier to make the necessary selection to get to the Tier 2 data from the non-selected hierarchy branch, likewise for any other tier, etc.). Thus, the system provides a way to rapidly change from one hierarchal branch to another hierarchal branch and, in a preferred form, to the same tier in the other hierarchal branch so that several navigating steps can be skipped to access data that the breadcrumb trail data indicates this user would be interested in.

While the database 680 is illustrated external to the electronic device 650 and in communication with same via network 670, it should be understood that in alternate embodiments the data contained in database 680 could alternatively be stored locally on the electronic device 650, such as in memory 660. As mentioned above, in a preferred form, the system 600 may be used to monitor and/or mine one or more retail store systems, such as store systems 690, 692 and 694. The retail store may be a multi-chain or multi-store retailer or a single store retailer, such as a kiosk operator, a traditional brick and mortar retailer, or an internet based retailer. The one or more store systems may be operated on electronic device 650 or other systems remote from device 650, or on both device 650 and remote electronic devices. For example, in a multi-store retailer store systems some of the store systems may be spread throughout the individual stores and report back to a central computer system or processing center where the data is maintained (either physically there or on a cloud-based system) and managers can access the data from any location (e.g., central headquarters, individual stores, remotely from home or a consultant's office, etc.).

In some forms, the cross-navigational data displayed by system 600 is drawn at least in part from prior store related parameters the user has reviewed using the system 600. For example, the breadcrumb trail data comprises one or more data fields or tiers corresponding to region, division, market and/or store. The retail store may include a plurality of retail stores categorized by region, division, market and store and the displayed breadcrumb trail may include at least one of the region, division, market and store different from the region, division, market and store of the first displayed breadcrumb trail. This may also include additional fields, such as sub-division, retail chains, etc.

In preferred version of the system or apparatus of FIG. 6, the electronic device 650 will preferably be a computer (e.g., a desktop computer, laptop computer, tablet or other mobile device) having a processor configured to run the program or interface discussed herein. The database 680 will preferably be cloud based and located remote from the electronic device 650, with the components 650 and 680 being connected via the Internet, and the one or more store systems 690, 692, 694 etc. will preferably be a business enterprise platforms, such as Oracle's Business Intelligence Enterprise Edition ("OBIEE"), with dashboard capabilities that allow managers to oversee a variety of business operation data and allows the manager to focus in on various aspects of that data that he or she sees fit. Preferably the one or more store systems 690 will operate on both remote computers located at individual stores and at a central location such as corporate headquarters or a central processing center. Thus, the electronic device 650 could be a local device capable of accessing a remote computer system either containing the database 680 or in network communication with the database 680. The system may be used to obtain information on at least one retail item such as data pertaining to at least one retail store and the database 680 contains business intelligence pertaining to the at least one retail store. In one form, the system includes at least one retail store device 650 in network communication with the database 680 and configured to provide at least a portion of the business intelligence contained on the database 680. The first and second hierarchical lists of categories may comprise hierarchical lists of data pertaining to different departments of the at least one retail store and the pop-up menu dynamically populated and displayed by the control unit may contain data associated with the selected hierarchical list and tier of a first department as well as cross-navigational data corresponding to the common tier of data from the other, non-selected, hierarchical list of another department of the at least one retail store to simplify navigation and comparisons between the business data associated with each department. For example, the departments may be the same store department at different stores so that a manager can use the system to compare how these two departments are doing with respect to one another (e.g., comparing a Lawn & Garden department from store 200 to the Lawn & Garden department of store 800, etc.). As mentioned above, in a preferred form, the at least one retail store will comprise a plurality of retail stores, each having the retail store device in network communication with the database and configured to provide at least a portion of the business intelligence contained on the database, the hierarchical lists of data pertaining to different stores of the plurality of retail stores and the pop-up menu dynamically populated and displayed by the control unit contains data associated with the selected hierarchical list and tier of a first store as well as cross-navigational data corresponding to the common tier of data from the other, non-selected, hierarchical list of another store of the plurality of retail stores to simplify navigation and comparisons between the business data associated with each store.

In addition to the above mentioned systems and apparatus, it should be understood that computer implemented methods for dynamically populating a graphical user interface menu with a pop-up menu containing cross-navigational elements to navigate between different hierarchical lists of data are also disclosed herein. For example, in one form such methods include displaying a graphical user interface on a display having a menu with a first hierarchical list of categories and a second hierarchical list of categories, the hierarchical lists of categories being arranged into common tiers of data. The method further including determining which hierarchical list and tier has been selected by a user, and dynamically populating and displaying, via a processor, a pop-up menu containing data associated with the selected hierarchical list and tier as well as cross-navigational data corresponding to the common tier of data from the other, non-selected, hierarchical list to simplify navigation between hierarchical lists. In a preferred form, the method includes composing at least one of the first and second hierarchical lists of categories at least in part from breadcrumb trail data pertaining to data a user has recently accessed. In some examples, this can involve composing at least a portion of both the first and second hierarchical lists from respective first and second breadcrumb trails pertaining to data the user recently accessed while in each hierarchical list and dynamically populating and displaying the pop-up menu includes populating and displaying cross-navigational data that allows a user to change from the first breadcrumb trail to the second breadcrumb trails desired. The user interface and navigation aid may be directed to data for at least one retail store and providing the first breadcrumb trail and the second breadcrumb trail comprises displaying one or more data fields corresponding to region, division, market and/or store in each breadcrumb trail. For example, the at least one retail store may comprise a plurality of retail stores categorized by region, division, market and store and displaying one or more data fields corresponding to region, division, market and/or store comprises displaying in the first breadcrumb trail data pertaining to at least one of the region, division, market and store and displaying in the second breadcrumb trail data pertaining to at least one of the region, division, market and store that is different from the data displayed in the first breadcrumb trail.

While the above-mentioned embodiments discuss use of breadcrumb trail data to populate pop-up menus with cross-navigation data, it should be understood that this concept can be utilized in other types of systems using other tracking data. For example, metadata (or tags) or cookies may also be used in other forms of interfaces to provide cross-navigation population of pop-up menus.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept. It should also be understood that while certain features have been described with a specific embodiment, features of different embodiments may be combined with one another to form yet other embodiments as desired.

What is claimed is:

1. A system for dynamically populating a graphical user interface menu with a pop-up menu containing cross-navigational elements to navigate between different hierarchical lists of data, the system comprising:
   a database containing data pertaining to a plurality of retail items, wherein the database further associates the data into a plurality of tiered organizational structures; and
   an electronic device in communication with the database and having a control unit and at least one display, the control unit configured to:
      display a graphical user interface on the display having a menu with a first hierarchical list of categories or a second hierarchical list of categories, the hierarchical lists of categories being arranged into common tiers of data comprising multiple tiers hierarchically organized within each of the hierarchical lists and wherein the multiple tiers comprise a root tier and one or more sub-tiers;
      track, over time, historic repetitive navigations to different ones of the multiple tiers of the data using the graphical user interface;
      identify, based on the historic repetitive navigations according to tracked breadcrumb trail data tracked over time, an interest relevance specific to a particular user between two or more different tiers of two or more different hierarchical lists and of a same sub-tier level;
      determine which hierarchical list and which tier at a first sub-tier level of the multiple tiers along the hierarchical list has been selected by the particular user of numerous different users having access to the database through the displayed graphical user interface displayed through a respective electronic device used by the respective one of the numerous different users; and
      dynamically change and display, via the control unit, a pop-up menu, displayed associated with the particular user and in response to the selection by the particular user of the selected hierarchical list and the selected tier, based on the identified interest relevance of the selected hierarchical list and the selected tier to display data associated with the selected hierarchical list and the selected tier as well as cross-navigational data corresponding to the common tier of data at the same first sub-tier level from the other, non-selected, hierarchical list to simplify navigation between hierarchical lists in accordance with the identified interest relevance between tiers of different ones of the hierarchical lists.

2. The system of claim 1 wherein at least one of the first or second hierarchical list of categories is composed at least in part of the breadcrumb trail data pertaining to data the particular user has recently accessed.

3. The system of claim 2 wherein both the first and second hierarchical lists comprise respective first and second breadcrumb trails pertaining to data the particular user recently accessed while in each hierarchical list and the dynamically populated and displayed pop-up menu includes cross-navigational data that allows the particular user to change from the first breadcrumb trail to the second breadcrumb trails desired.

4. The system of claim 3 wherein the displayed cross-navigational data is drawn at least in part from prior store related parameters the particular user has reviewed using the system.

5. The system of claim 3 wherein the displayed first breadcrumb trail comprises one or more data fields corresponding to region, division, market and/or store.

6. The system of claim 3 wherein the at least one retail store comprises a plurality of retail stores categorized by region, division, market and store and the displayed second breadcrumb trail has at least one of the region, division, market and store different from the region, division, market and store of the first displayed breadcrumb trail.

7. The system of claim 1 wherein the electronic device is a central computer system and the database is either stored local to the central computer system or remotely from the central computer system.

8. The system of claim 1 wherein the electronic device is a local device capable of accessing a remote computer system either containing the database or in network communication with the database.

9. The system of claim 8 wherein the local device includes a control circuit electrically connected to a memory, a user interface, a display and a network interface, the network interface being used to connect the local device to the remote computer system and the controller capable of displaying the business intelligence and first and second breadcrumb trails on the display via the control circuit.

10. The system of claim 2 wherein the at least one retail item is data pertaining to at least one retail store and the database contains business intelligence pertaining to the at least one retail store, the system further comprising:
    at least one retail store device in network communication with the database and configured to provide at least a portion of the business intelligence contained on the database.

11. The system of claim 10 wherein the first and second hierarchical lists of categories comprise hierarchical lists of data pertaining to different departments of the at least one retail store and the pop-up menu dynamically populated and displayed by the control unit contains data associated with the selected hierarchical list and tier of a first department as well as cross-navigational data corresponding to the common tier of data from the other, non-selected, hierarchical list of another department of the at least one retail store to simplify navigation and comparisons between the business data associated with each department.

12. The system of claim 10 wherein the at least one retail store comprises a plurality of retail stores, each having the retail store device in network communication with the database and configured to provide at least a portion of the business intelligence contained on the database, the hierarchical lists of data pertaining to different stores of the plurality of retail stores and the pop-up menu dynamically populated and displayed by the control unit contains data associated with the selected hierarchical list and tier of a first store as well as cross-navigational data corresponding to the common tier of data from the other, non-selected, hierarchical list of another store of the plurality of retail stores to simplify navigation and comparisons between the business data associated with each store.

13. A computer implemented method for dynamically populating a graphical user interface menu with a pop-up menu containing cross-navigational elements to navigate between different hierarchical lists of data, the method comprising:
    displaying a graphical user interface on a display having a menu with a first hierarchical list of categories and a second hierarchical list of categories, the hierarchical lists of categories being arranged into common tiers of data comprising multiple tiers hierarchically organized within each of the first and second hierarchical lists, wherein the first hierarchical list of categories and the second hierarchical list of categories are two of a plurality of hierarchical lists maintained in a database of data pertaining to a plurality of retail items, wherein the database further associates the data into the plurality of hierarchical lists providing tiered organizational structures within each of the hierarchical lists and wherein the multiple tiers in each of the plurality of hierarchical lists comprises a root tier and one or more sub-tiers;
    tracking, over time, historic repetitive navigations to different ones of the multiple tiers of the data using the graphical user interface;
    identifying, based on the historic repetitive navigations according to tracked breadcrumb trail data tracked over time, an interest relevance specific to a particular user between two or more different tiers of two or more different hierarchical lists and of a same sub-tier level;
    determining which hierarchical list and which tier at a first sub-tier level of the multiple tiers along the hierarchical list has been selected by the particular user of numerous different users having access to the database through the displayed graphical user interface displayed through a respective electronic device used by the respective one of the numerous different users; and
    dynamically change and displaying, via a processor, a pop-up menu, displayed associated with the particular user and in response to the selection by the particular user of the selected hierarchical list and the selected tier, based on the identified interest relevance of the selected hierarchical list and the selected tier to display data associated with the selected hierarchical list and the selected tier as well as cross-navigational data corresponding to the common tier of data at the same first sub-tier level from the other, non-selected, hierarchical list to simplify navigation between hierarchical lists in accordance with the identified interest relevance between tiers of different ones of the hierarchical lists.

14. The method of claim 13 further comprising: composing at least one of the first and second hierarchical lists of categories at least in part from the breadcrumb trail data pertaining to data the particular user has recently accessed.

15. The method of claim 14 comprising composing at least a portion of both the first and second hierarchical lists from respective first and second breadcrumb trails pertaining to data the particular user recently accessed while in each hierarchical list and dynamically populating and displaying the pop-up menu includes populating and displaying cross-navigational data that allows the particular user to change from the first breadcrumb trail to the second breadcrumb trails desired.

16. The method of claim 15 wherein the user interface and navigation aid is directed to data for at least one retail store and providing the first breadcrumb trail and the second breadcrumb trail comprises displaying one or more data fields corresponding to region, division, market and/or store in each breadcrumb trail.

17. The method of claim 16 wherein the at least one retail store comprises a plurality of retail stores categorized by region, division, market and store and displaying one or more data fields corresponding to region, division, market and/or store comprises displaying in the first breadcrumb trail data pertaining to at least one of the region, division, market and store and displaying in the second breadcrumb trail data pertaining to at least one of the region, division, market and store that is different from the data displayed in the first breadcrumb trail.

18. A graphical user interface for dynamically populating and providing a pop-up menu containing cross-navigational elements to navigate between different hierarchical lists of data, the method comprising:
    a display for displaying a graphical user interface having a menu with a first hierarchical list of categories and a second hierarchical list of categories, the hierarchical lists of categories being arranged into common tiers of data comprising multiple tiers hierarchically organized within each of the first and second hierarchical lists, wherein the first hierarchical list of categories and the second hierarchical list of categories are two of a plurality of hierarchical lists maintained in a database of data pertaining to a plurality of retail items, wherein the database further associates the data into the plurality of hierarchical lists providing tiered organizational structures within each of the hierarchical lists and wherein the multiple tiers in each of the plurality of hierarchical lists comprises a root tier and one or more sub-tiers;
    a control unit executing code and configured to: track, over time, historic repetitive navigations to different ones of the multiple tiers of the data using the graphical user interface; identify, based on the historic repetitive navigations according to tracked breadcrumb trail data tracked over time, an interest relevance specific to a particular user between two or more different tiers of two or more different hierarchical lists and of a same sub-tier level; determine which hierarchical list and which tier at a first sub-tier level of the multiple tiers along the hierarchical list has been selected by the particular user, of numerous different users having access to the database through the displayed graphical user interface displayed through a respective electronic device used by the respective one of the numerous different users, and configured to dynamically change and display on the display, via a processor, a pop-up menu, displayed associated with the particular user and in response to the selection by the particular user of the selected hierarchical list and the selected tier, based on the identified interest relevance of the selected hierarchical list and the selected tier to display data associated with the selected hierarchical list and the selected tier as well as cross-navigational data corresponding to the common tier of data at the same first sub-tier level from the other, non-selected, hierarchical list to simplify navigation between hierarchical lists in accordance with the identified interest relevance between tiers of different ones of the hierarchical lists.

19. The graphical user interface of claim 18 wherein the control unit composes at least one of the first and second hierarchical lists of categories at least in part from the breadcrumb trail data pertaining to data the particular user has recently accessed.

20. The graphical user interface of claim 19 wherein the control unit composes at least a portion of both the first and second hierarchical lists from respective first and second breadcrumb trails pertaining to data the particular user recently accessed while in each hierarchical list and dynamically populating and displaying the pop-up menu includes populating and displaying cross-navigational data that allows the particular user to change from the first breadcrumb trail to the second breadcrumb trails desired.

* * * * *